US007741937B2

(12) United States Patent
Mori et al.

(10) Patent No.: US 7,741,937 B2

(45) Date of Patent: Jun. 22, 2010

(54) POWER SWITCHING APPARATUS AND METHOD OF CONTROLLING THE SAME

(75) Inventors: Tomohito Mori, Tokyo (JP); Haruhiko Koyama, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 303 days.

(21) Appl. No.: 12/071,712

(22) Filed: Feb. 25, 2008

(65) Prior Publication Data

US 2009/0058573 A1 Mar. 5, 2009

(30) Foreign Application Priority Data

Sep. 3, 2007 (JP) ............................ 2007-227853

(51) Int. Cl.
*H01H 83/06* (2006.01)
*H02H 3/00* (2006.01)

(52) U.S. Cl. ...................... 335/8; 335/2; 361/5; 361/15

(58) Field of Classification Search ..................... 335/2, 335/6, 8; 361/5, 14
See application file for complete search history.

(56) References Cited

U.S. PATENT DOCUMENTS 4,068,159 A * 1/1978 Gyugyi ....................... 323/211
5,644,463 A * 7/1997 El-Sharkawi et al. ......... 361/94
6,172,863 B1 1/2001 Ito et al.
6,392,390 B1 * 5/2002 Ito et al. ..................... 323/209
7,233,082 B2 * 6/2007 Furuya et al. ................. 307/64
2007/0206395 A1 * 9/2007 Lincoln et al. ............. 363/56.1
2009/0097173 A1 * 4/2009 Kinoshita et al. ............. 361/35
2009/0315654 A1 * 12/2009 Halen et al. ................. 335/201

FOREIGN PATENT DOCUMENTS

JP 2004-55420 A 2/2004

* cited by examiner

*Primary Examiner*—Elvin G Enad
*Assistant Examiner*—Bernard Rojas
(74) *Attorney, Agent, or Firm*—Buchanan Ingersoll & Rooney PC

(57) ABSTRACT

A power switching apparatus includes a breaker unit, an operating unit, a measuring unit, and a controlling unit. The breaker unit is connected on a three-phase current line, and includes switches each corresponding to one of phases of the three-phase current line. The operating unit simultaneously turns on or off the switches. The measuring unit measures a current flowing in each phase, and determines a time point where current flowing in one of the phases becomes zero as a reference time point. The controlling unit controls, when interrupting load current, the operating unit to turn off the switches in a range from 20 degrees to 40 degrees of an electric angle from the reference time point.

2 Claims, 4 Drawing Sheets

POWER SWITCHING APPARATUS AND METHOD OF CONTROLLING THE SAME

BACKGROUND OF THE INVENTION

1. Field of the Invention

The present invention relates to a technology for control of power switch.

2. Description of the Related Art

A power switching device, such as a circuit breaker, has a problem that reignition occurs during operation of breaking a small capacitive current, such as a charging current in an unloaded power line or a load current in a capacitor bank. One conventional approach for preventing such reignition is to operate the power switching device at high speed before the recovery voltage reaches its crest value, i.e., for approximately 10 milliseconds, when the power switching device interrupts current. As a result, insulation recovery can be achieved before the recovery voltage rises.

For example, Japanese Patent Application Laid-open No. 2004-55420 discloses a conventional circuit breaker in which a movable contact is coupled to a switch driving mechanism through a cam mechanism, which moves the movable contact at relatively high speed at an early stage of opening stroke of the movable contact. Accordingly, the movable contact can be moved at relatively high speed only in necessary part of its full stroke, and does not need to be moved at high speed throughout the full stroke. As a result, energy for driving the movable contact can be lowered, and the size of the circuit breaker can be reduced.

With the conventional circuit breaker, however, a coupling mechanism including the cam mechanism needs to be arranged between the movable contact and the switch driving mechanism. Therefore, the circuit breaker is necessitated to be of complex configuration, making it difficult to simplify the switch driving mechanism. Furthermore, because a large force is applied to the coupling mechanism during operation, the cam mechanism needs to be composed of rigid members, and thereby the cost and the size of the circuit breaker increase.

Although the conventional circuit breaker can be operated while there is no reignition, it is a single-phase circuit breaker capable only of separately interrupting a current flow in each phase.

SUMMARY OF THE INVENTION

It is an object of the present invention to at least partially solve the problems in the conventional technology.

According to an aspect of the present invention, a power switching apparatus includes a breaker unit that is connected on a three-phase current line between a load circuit and a power-supply circuit that supplies driving power to the load circuit. The breaker-unit includes a plurality of switches each corresponding to one of three phases of the three-phase current line, and an arc-extinguishing chamber that houses the switches. The power switching apparatus further includes: an operating unit that is configured to simultaneously-turn the switches on or off; a measuring unit that measures a current flowing in each phase of the three-phase current line at a point between the power-supply circuit and the breaker unit, and determines a time point at which a current flowing in an arbitrary one of the phases of the three-phase current line becomes zero as a reference time point; and a controlling unit that controls, upon interrupting load current including a small capacitive current, the operating unit to turn off the switches during a time period from the reference time point corresponding to a range from 20 degrees to 40 degrees of an electric angle.

According to another aspect of the present invention, a method of controlling a power switching apparatus that includes a breaker unit connected on a three-phase current line between a load circuit and a power-supply circuit that supplies driving power to the load circuit, and that is controlled such that the breaker unit turns on or off based on a current flowing in each phase of the three-phase current line. The method includes: determining a time point at which a current flowing in an arbitrary one of the phases of the three-phase current line becomes zero as a reference time point; and controlling, upon interrupting load current including a small capacitive current, the breaker unit to be off during a time period from the reference time point corresponding to a range from 20 degrees to 40 degrees of an electric angle.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
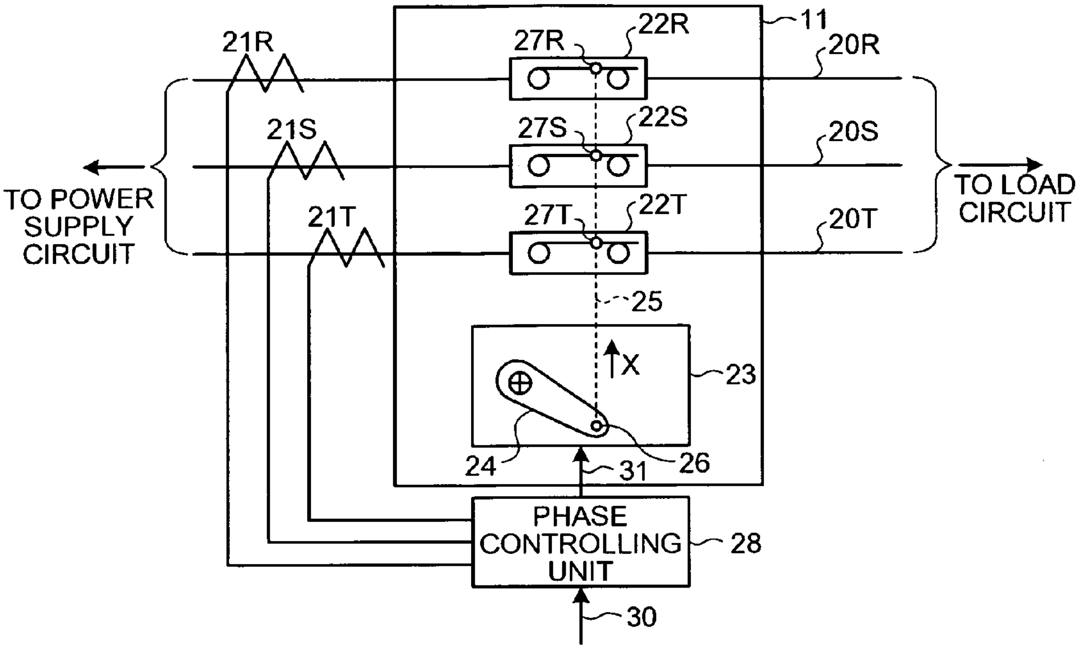
FIG. 1 is a schematic diagram of a power switching apparatus, in which a circuit breaker is ON, according to an embodiment of the present invention.

FIG. 1 is a schematic diagram of a power switching apparatus according to an embodiment of the present invention. The power switching apparatus includes a circuit breaker (hereinafter, "breaker") 11 and a phase controlling unit 28. The breaker 11 is on three power lines 20R, 20S, and 20T that connect between a load circuit and a power-supply circuit that supplies driving power to the load circuit. The phase controlling unit 28 is, e.g., a microprocessor, and controls the ON/OFF position of the breaker 11. Current measuring units 21R, 21S, and 21T are arranged on the power lines 20R, 20S, and 20T, respectively, on the side of the power-supply circuit. The current measuring units 21R, 21S, and 21T measure currents flowing in three phases of the power lines 20R, 20S, and 20T, respectively. The phase controlling unit 28 performs such operations as controlling the phases of the power lines 20R, 20S, and 20T, in response to output signals from the current measuring units 21R, 21S, and 21T and an OFF command signal 30 or an ON command signal 32 (see FIG. 2) from an external device such as an upper device. Thus, the phase controlling unit 28 controls the breaker 11 to be turned ON or OFF.

As shown in FIG. 1, the breaker 11 simultaneously interrupts current through the three phases of the power lines 20R, 20S, and 20T. The breaker 11 includes arc-extinguishing chambers 22R, 22S, and 22T, an operating device 23, and a coupling mechanism 25. The arc-extinguishing chambers 22R, 22S, and 22T are arranged for the three phases of the power lines 20R, 20S, and 20T, respectively. The operating device 23 simultaneously drives contacts (not shown) arranged in each of the arc-extinguishing chambers 22R, 22S, and 22T. The coupling mechanism 25 connects a coupling point 26 provided on a lever 24 in the operating device 23 to coupling points 27R, 27S, and 27T provided in the arc-extinguishing chambers 22R, 22S, and 22T, respectively.

Figure 2:
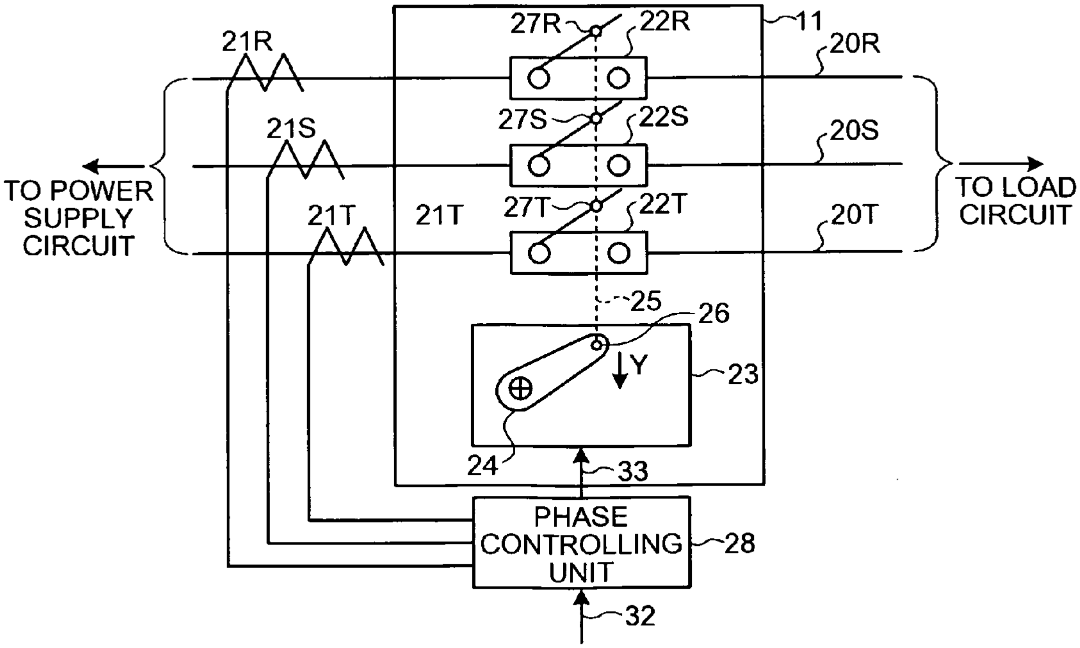
FIG. 2 is a schematic diagram of the power switching apparatus, in which the circuit breaker is OFF.

The operating device 23 drives the coupling mechanism 25 in the direction indicated by an arrow X, so that the breaker 11, which is ON as shown in FIG. 1, is turned OFF. On the other hand, the operating device 23 drives the coupling mechanism 25 in the direction indicated by an arrow Y, so that the breaker 11, which is OFF as shown in FIG. 2, is turned ON.

When the OFF command signal 30 is fed to the phase controlling unit 28 from the external device (not shown), the phase controlling unit 28 detects a current flowing in each of the three phases of the power lines 20R, 20S, and 20T, based on an output signal from each of the current measuring units 21R, 21S, and 21T. The phase controlling unit 28 outputs an OFF control signal 31 to the operating device 23 to interrupt the current flowing in the power lines 20R, 20S, and 20T at optimal phases. The operating device 23 drives the lever 24 to move the coupling mechanism 25 in the direction indicated by the arrow X, thereby performing the current interruption. When the current interruption is completed, the breaker 11 is turned OFF as shown in FIG. 2.

When the ON command signal 32 is fed to the phase controlling unit 28 from the external device (not shown), the phase controlling unit 28 detects a current flowing in each of the three phases of the power lines 20R, 20S, and 20T, based on an output signal from each of the current measuring units 21R, 21S, and 21T. The phase controlling unit 28 outputs an ON control signal 33 to the operating device 23 to supply current to the power lines 20R, 20S, and 20T at optimal phases. The operating device 23 drives the lever 24 to move the coupling mechanism 25 in the direction indicated by the arrow Y, thereby providing current supply to the power lines 20R, 20S, and 20T. When the current supply is completed, the breaker 11 is turned ON as shown in FIG. 1.

When a small capacitive current, such as a charging current in an unloaded power line or a load current in a capacitor bank, is interrupted, an electric arc occurs between the contacts in the arc-extinguishing chamber during a period from when the contacts are turned OFF to when the current becomes zero (current: zero point). A period during which the electric arc occurs is referred to herein as arc duration t.

Figure 3:
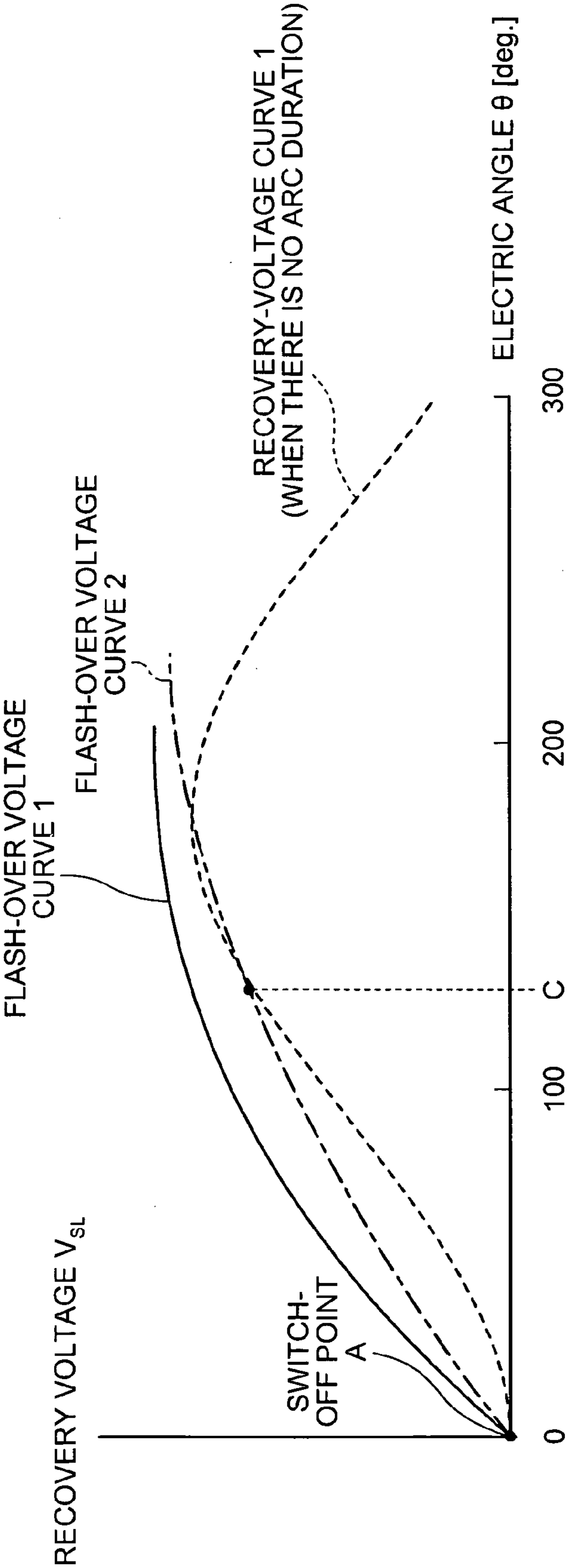
FIG. 3 is a graph for explaining dielectric strength between contacts in the power switching apparatus.

FIG. 3 is a graph for explaining dielectric strength between the contacts in the power switching apparatus. In FIG. 3, a horizontal axis represents an electric angle θ, and a vertical axis represents a recovery voltage $V_{SL}$ between the contacts. A recovery-voltage curve 1 shows a voltage characteristic in the case of arc duration t=0 (zero). FIG. 3 depicts two curves of flash-over voltage between the contacts, i.e., a flash-over voltage curve 1 (solid line) and a flash-over voltage curve 2 (dashed-dotted line), in the case where the currents are interrupted, i.e., the contacts are turned OFF, at a switch-OFF point A (electric angle θ=0°). Each of the flash-over voltage curves 1, and 2 shows the dielectric strength between the contacts determined by interrupting or breaking performance between the contacts after they are turned OFF at the switch-OFF point A, contact-opening speed, or the like.

Assume that the dielectric strength between the contacts in the breaker 11 is as indicated by the flash-over voltage curve 2 shown in FIG. 3. The flash-over voltage curve 2 goes lower than the recovery-voltage curve 1 at a point C where the flash-over voltage curve 2 crosses the recovery-voltage curve 1. As a result, a flashover (reignition) occurs between the contacts. To prevent the reignition during the operation of interrupting the small capacitive current, the flash-over voltage curve needs to be above the recovery-voltage curve.

Figure 4:
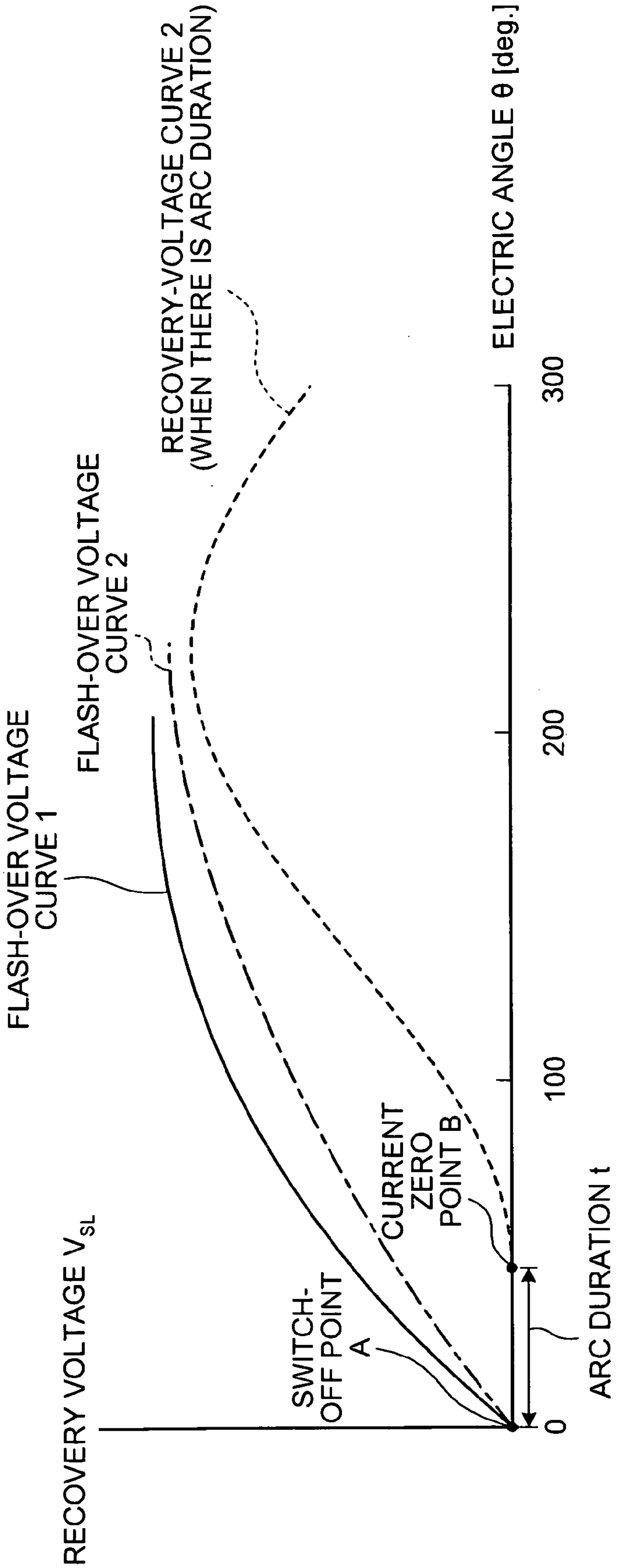
FIG. 4 is a graph for explaining open-phase control in the power switching apparatus shown in FIG. 2.

FIG. 4 is a graph for explaining open-phase control in the power switching apparatus. As shown in FIG. 4, the recovery-voltage curve 1 shown in FIG. 3 is replaced by a recovery-voltage curve 2 that shows a voltage characteristic in the case where an electric arc occurs for a certain period (i.e., a certain arc duration t).

As can be seen by comparing FIGS. 3 and 4, the recovery voltage rises at the time the contacts are turned OFF if arc duration t=0 (zero). In such a case, it is difficult to perform the current interruption. On the other hand, if there is a certain arc duration t, the recovery voltage does not rise during the arc duration t. Therefore, it is possible to have more allowance for achieving sufficient interrupting or breaking performance.

Figure 5:
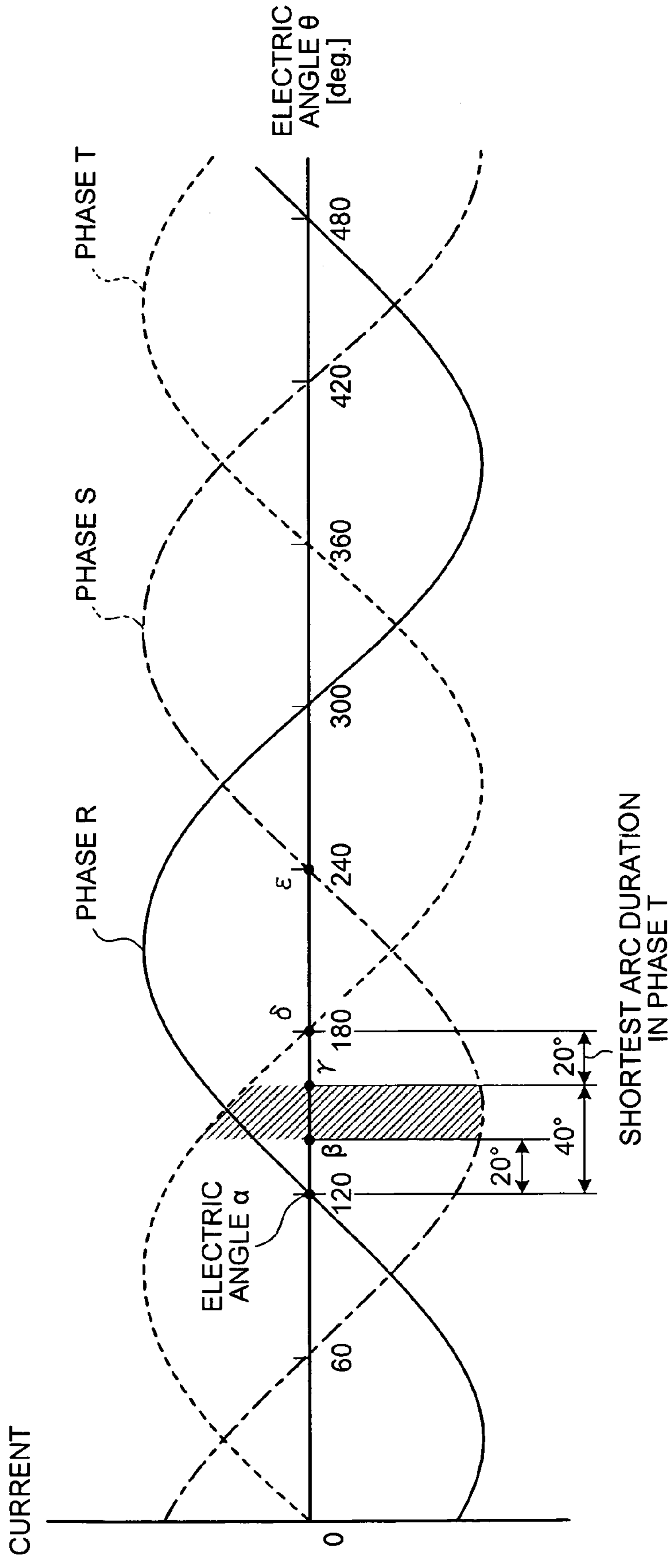
FIG. 5 is a graph of three phases of alternating current waveforms.

FIG. 5 is a graph of three phases of alternating current waveforms, where a horizontal axis represents an electric angle θ. Assume now that when a current flowing in one of the three phases, e.g., a phase R, electric angle θ is α degrees; when the electric angle θ advances by 20 degrees from the current zero point (electric angle θ:α degrees), it is β degrees; when the electric angle θ advances by 20 degrees from β degrees, it is γ degrees; when the electric angle θ advances by 20 degrees from γ degrees, it is δ degrees; and when the electric angle θ advances by 60 degrees from δ degrees, it is ∈ degrees. Immediately after the current in the phase R becomes zero at the electric angle θ of α degrees, currents flowing in phases S and T become zero at the electric angle θ of ∈ degrees and δ degrees, respectively. The currents flowing in the phases R, S, and T are simultaneously interrupted in a range of 20 degrees to 40 degrees from α degrees, i.e., in the range from the electric angle β degrees to γ degrees. As a result, as shown in FIG. 5, the electric angle of more than 140 degrees: 300 degrees−(120 degrees+40 degrees), is provided for the arc duration in the phase R. The electric angle of more than 80 degrees: 240 degrees−(120 degrees+40 degrees), is provided for the arc duration in the phase S. The electric angle of more than 20 degrees: 180 degrees−(120 degrees+40 degrees), is provided for the arc duration in the phase T, in which arc duration t is the shortest among the three phases.

To sum up, a time point at which a current flowing in arbitrary one of three phases becomes zero is set as a reference time point. Upon breaking a load current including a small capacitive current, each contact of the breaker is turned off during a time period from the reference time point corresponding to a range from 20 degrees to 40 degrees of an electric angle. Thus, it is possible to prevent reignition during the breaking process, and reduce the size and cost of the power switching apparatus.

As described above, according to the embodiment, sufficient arc duration can be provided for each of the three phases when the breaker controls the three phases to interrupt the current. Therefore, sufficient interrupting or breaking performance can be achieved between the contacts before the recovery voltage rises, and contact-opening speed can be reduced. Thus, it is possible to prevent reignition during current interruption in a simple and effective manner.

Furthermore, it is possible to reduce the size of the arc-extinguishing chamber, an amount of operational force, and complexity of the coupling mechanism, resulting in a downsized low-cost power switching apparatus.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power switching apparatus comprising:

a breaker unit that is connected on a three-phase current line between a load circuit and a power-supply circuit that supplies driving power to the load circuit, the breaker unit including a plurality of switches each corresponding to one of three phases of the three-phase current line; and an arc-extinguishing chamber that houses the switches;

an operating unit that is configured to simultaneously turn the switches on or off;

a measuring unit that measures a current flowing in each phase of the three-phase current line at a point between the power-supply circuit and the breaker unit, and determines a time point at which a current flowing in an arbitrary one of the phases of the three-phase current line becomes zero as a reference time point; and a controlling unit that controls, upon interrupting load current including a small capacitive current, the operating unit to turn off the switches during a time period from the reference time point corresponding to a range from 20 degrees to 40 degrees of an electric angle.

2. A method of controlling a power switching apparatus, the power switching apparatus including a breaker unit connected on a three-phase current line between a load circuit and a power-supply circuit that supplies driving power to the load circuit, the power switching apparatus being controlled such that the breaker unit turns on or off based on a current flowing in each phase of the three-phase current line, the method comprising:

determining a time point at which a current flowing in an arbitrary one of the phases of the three-phase current line becomes zero as a reference time point; and controlling, upon interrupting load current including a small capacitive current, the breaker unit to be off during a time period from the reference time point corresponding to a range from 20 degrees to 40 degrees of an electric angle.

* * * * *